Sept. 14, 1965   J. GOODMAN ETAL   3,206,659
TRIMMER CAPACITOR WITH RADIATION ABSORBING GLASS ENVELOPE
Filed May 10, 1963
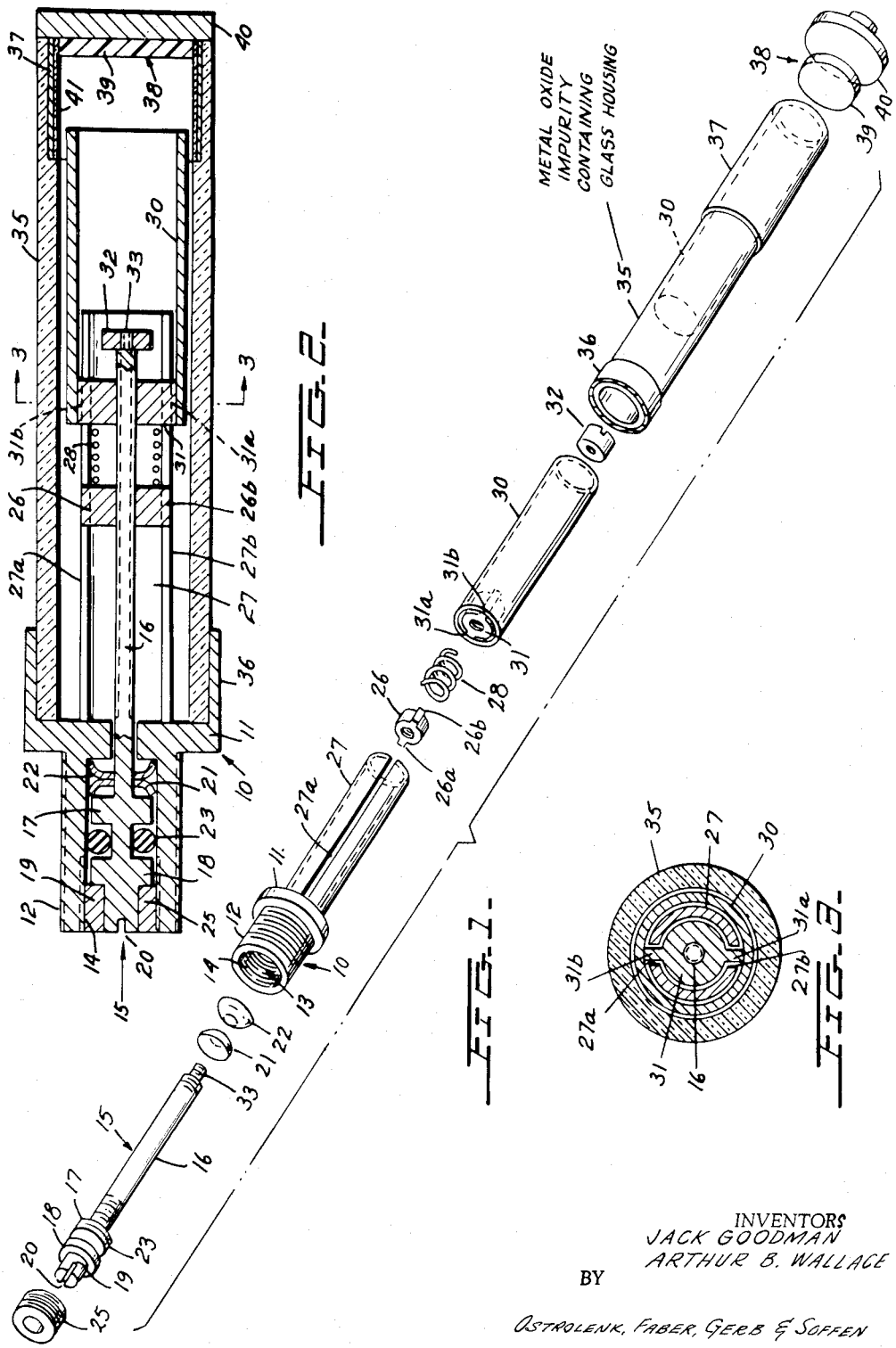
INVENTORS
JACK GOODMAN
ARTHUR B. WALLACE
BY
OSTROLENK, FABER, GERB & SOFFEN
ATTORNEYS

United States Patent Office 3,206,659
Patented Sept. 14, 1965

3,206,659
TRIMMER CAPACITOR WITH RADIATION ABSORBING GLASS ENVELOPE
Jack Goodman, Great Neck, and Arthur B. Wallace, Baldwin, N.Y., assignors to JFD Electronics Corporation, Brooklyn, N.Y., a corporation of New York
Filed May 10, 1963, Ser. No. 279,462
7 Claims. (Cl. 317—248)

This invention relates to adjustable electrical reactance devices and more particularly relates to improved trimmer capacitors.

Trimmer capacitors are well known for use in the precision adjustment of capacitances. Such capacitors are often formed as tubular members as shown, for example, in United States Patent No. 2,922,093, assigned to the assignee of the present invention.

Tubular trimmer capacitors of the type under consideration include a longitudinally movable piston serving as a first electrode member, and a second fixed electrode, which may be in the form of a conductive metal band, separated by a dielectric medium, e.g., a thin glass layer, and secured within an outer tubular glass housing. Movement of the adjustable piston lengthwise of such housing varies the capacitance between the respective electrodes and provides the desired tuning characteristics of the device.

In such devices the movable piston and other metallic parts may be constituted of any of a wide range of relatively inexpensive conductive materials, e.g., of a low expansion high nickel alloy such as Invar which, desirably, is silver plated to improve its conductivity. In order to protect the silver-plating formed on the piston or other parts of such a trimmer capacitor it is known to provide an amorphous chromate conversion coating thereon; such a protective coating is formed by the reaction of chromic acid with the surface layer of the silver plating. When such an amorphous film is exposed to light and heat for prolonged periods of time, e.g., by radiation through the transparent capacitor housing, the chromate conversion coating crystallizes, increasing its susceptibility to cracking. When such a coating cracks the resulting fissures expose the underlying silver plating to the air, permitting the silver plating to tarnish. Such tarnishing increases the resistivity of the plated electrodes and accordingly changes the electrical characteristics of the trimmer capacitor.

It is accordingly among the objects of the present invention to provide a trimmer capacitor construction having improved stability to prolonged exposure to heat and light.

Other objects and advantages of the present invention will be more fully apparent from a consideration of the following detailed description thereof.

In accordance with the invention, it has been found that the stability of the electrical characteristics of a tubular trimmer capacitor may be improved by enclosing at least the movable electrode of such device within a housing constituted of a borosilicate, potash-lead or potash-soda-lead glass, containing up to about 5% by weight of a chromium, cobalt, manganese, iron, cadmium, gold or selenium oxide, alone or in admixture with one another. It has been found that, by incorporating such a controlled metal oxide impurity in the glass employed to form the tubular glass housing of the trimmer capacitor, radiation heating of the inner components of the capacitor is markedly decreased, thereby increasing the lifetime of the amorphous chromate conversion coatings formed on the silved plated elements and stabilizing the electrical characteristics of the capacitor. Moreover, it is believed that the metal oxide containing glass housing, which possesses decreased light and heat transmission properties, may additionally stabilize the electrical properties of the capacitor with respect to variations in frequency and incident cosmic ray radiations.

As indicated above, the metal oxide impurity is incorporated in the glass in an amount of up to about 5%, preferably from about 0.01% to 5% by weight. It is preferred to utilize, as the metal oxide component, one or more of the oxides of chromium, cobalt, manganese or iron. Employing ferric oxide, for example, the impurity is incorporated in an amount of from about 0.5 to 5% of the glass composition. In the case of manganese dioxide it is preferred to incorporate from about 1% to 5%, desirably about 3%, in the glass batch, while in the case of cobalt oxide ($Co_3O_4$) only about 0.02 to 0.6%, preferably about 0.4%, by weight of the metal oxide is employed. It has been found most desirable, however, to utilize a chromic oxide as the oxide contaminant in the glass composition. The chromic oxide is incorporated in the glass batch prior to fusion, in the form $Cr_2O_3$, as a double oxide, e.g., an alkali metal dichromate such as $K_2Cr_2O_7$, os as some other suitable salt, in an amount of from about 0.2 to 1.5%, preferably about 0.3% of the glass.

It will of course be understood that two or more of the oxide impurities may be employed in admixture in the glass composition. When, for example, $Cr_2O_3$ and $Co_3O_4$ are thus admixed, they are preferably utilized in amounts of from 0.5 to 1% and 0.02 to 0.4%, by weight, respectively.

The incorporation of controlled impurities in the glass batch employed to form the tubular glass envelope of a trimmer capacitor, in accordance with the invention, is more fully described below in connection with a preferred embodiment, employing the capacitor structure disclosed in copending application Serial No. 183,512 entitled "Direct Travel Mechanism," assigned to the assignee of the present invention. It will be understood that the present invention may be utilized in connection with other trimmer capacitor structures and that the following description is intended as illustrative only.

In the drawing:
FIGURE 7 is an exploded perspective diagram of the aforesaid trimmer capacitor embodiment;
FIGURE 2 is a side cross-sectional view of the embodiment shown in FIGURE 1 in assembled relation; and
FIGURE 3 is a cross-sectional view viewed in the direction of line 3—3 in FIGURE 2.

With reference to the drawing, the embodiment illustrated comprises a bushing 10 having a mounting flange 11 and a threaded mounting portion 12 which could, for example, receive a nut for mounting the device to a panel.

The bushing 10 has an internal opening 13 extending therethrough which is threaded as shown by threads 14. An adjustment member 15 extends through opening 13, and is comprised of an elongated threaded shank portion 16, and a head portion which is formed of first and second flanges 17 and 18 respectively and a tool receiving portion 19 which has, for example a slot 20 which can receive a screwdriver.

First and second Belleville washers 21 and 22, respectively, are first mounted on the shank 16 of adjusting member 15 and an O-ring 23 is captured between flanges 17 and 18. Thereafter, the member 15 is inserted through opening 13 as illustrated in FIGURE 2 so that the right hand side of flange 17, or alternatively the left hand side of flange 18 bears against the Belleville washers 21 and 22. An adjustment and retaining nut 25 is then threaded into threads 14 and against the left hand side of flange 18 to cause compression of the Belleville washers 21 and 22 and to capture member 15 in bushing 10. By appropriately adjusting screw 25, a specific torque will be thereafter required to rotate screw 15 with respect to bushing 10.

It is to be noted that the adjusting screw 25 could be replaced by any other capturing arrangement and, after torque adjustment, could be permanently secured to bushing 10.

Thereafter, a tension nut 26 which has extending ear portions 26a and 26b is threaded on shank 16. The ear portions 26a and 26b are received in slots 27a and 27b of bushing portion 27 which is secured to the right hand side of flange 11. Thus, rotation of screw 15 will cause the tension nut 26 to move with transverse motion along the axis of bushing 27 without rotating.

If desired, slots 27a and 27b can be breached into the inner diameter of bushing 10 to permit greater travel of nut 26 to decrease the required length of the device as further shown in said copending application. A helical spring is then inserted within bushing 27 and against the right hand side of tension nut 26.

A movable piston 30 is then formed to have a nut 31 captured therein which has extending ears 31a and 31b in a manner similar to the construction of tension nut 26. The ears 31a and 31b of nut 31, however, extend beyond the outer diameter of piston 30 and the outer diameter of bushing 27 which are telescoped into position with respect to one another.

The piston is constituted of an Invar alloy, the outer cylindrical surface of which is silver-plated and then treated with chromic acid to form a protective chromate conversion coating thereon.

The ears 31a and 31b of nut 31 can be directly secured to the inner walls of piston 30. If desired, the outer surfaces of the ears 31a and 31b can have threads which are received by cooperating threads on the inner diameter of the piston 30 with the nut 31 being threaded into position and then staked to piston 30.

Moreover, the nut 31 can be an integral part of piston 30 with ears 31a and 31b extending along the full length of the piston. In such a case, the piston 30 and nut 31 could be extruded as a unitary body as further described in said copending application.

In assembly piston 30 and bushing 27, the nut 31 is threaded on shank 16 after the helical spring 28 is placed in position with ears 31a and 31b of screw 31 entering slots 27a and 27b of bushing 27. Moreover, sufficient spacing is permitted between nuts 26 and 31 so that the spring 28 pre-loads the connection between piston 30 and tension nut 26 to eliminate backlash between shank 16 and the internal thread in nut 31. Thereafter, a stop nut 32 or any other desired stop means is threaded on the reduced threaded portion 33 of shank 16 to prevent piston 30 from being disassembled from screw 16 when screw 31 reaches its maximum travel on shank 16.

The piston is then enclosed within a cylindrical glass housing 35, constituted, in accordance with one embodiment of the invention, of a potash-lead glass, e.g., one of those glasses commercially available such as Corning Glass 8161, 8870, or 8871, to which 0.3%, by weight, of chromic oxide has been added prior to fusing and forming into its cylindrical shape. The dielectric glass cylinder, which is tinted by the addition of the chromic oxide impurity, carries an attachment band 36 and an electrode band 37. The cylinder is then secured to bushing 10 as by soldering from band 36 to flange 11 to the bushing 10 and snuggly receives piston 30.

An end cap 38 formed of an insulation washer 39 and conductive terminal member 40 then seal the cylinder 35. The insulation washer 39 insures against accidental contact between the end of piston 30 and terminal 40.

The electrode band 37 is carried or embedded between two glass cylinders 35 and 41. Thus, the end of cylinder 35 may be undercut as shown as undercut section 40 and conductive band 37 may be deposited therein. An insulation sleeve 41 may be then applied over band 40 to prevent shorting between piston 30 and band 37. Clearly, the band 37 could be embedded in or secured to glass tube 35 in any other desired manner.

In operation, the device operates as a variable capacitor having electrodes 30 and 37. The electrode or piston 30 is adjustably positioned within band 37 whereby the position of the piston 30 determines the capacitance between electrode 37 and piston 30 which is electrically connected to bushing 10. Such capacitor may be operated in the presence of elevated ambient temperatures for prolonged periods without change in the capacitance characteristics thereof.

In another embodiment of the invention the dielectric cylinder 35 of the device described above is replaced by a cylinder constituted of a potash-soda-lead glass, e.g., that commercially available as Corning Glass 0120, to which 0.4% by weight of $Co_3O_4$ has been added prior to fusing and forming. The dielectric cylinder, which is tinted blue by the cobalt oxide impurity, decreases light and heat transmission through the capacitor walls, thereby increasing the durability of the amorphous chromate conversion coating on piston 30 and improving the capacitor's stability.

In a still further embodiment of the invention the dielectric cylinder may be composed of a borosilicate glass containing a mixture of $Cr_2O_3$ and $Co_3O_4$ in amounts of 0.8% and 0.05%, by weight of the glass batch, respectively. The thus compounded dielectric cylinder 36 is tinted a deep bluish green.

Since these and other changes may be made in the described embodiment without departing from the scope of the present invention, it will be understood that we prefer to be limited not by the specific disclosure hereinabove but only by the appended claims.

The embodiments of the invention in which an exclusive privilege or property is claimed are defined as follows:

1. An adjustable capacitor comprising, in combination, a hollow dielectric form having an electrode secured thereto, a conductive piston contained coaxially within said dielectric form and being movable along the axis of said dielectric from, at least a portion of said piston being silver-plated and incorporating a protective amorphous chromate coating thereon, a support bushing and an operating mechanism for moving said piston lengthwise of said dielectric form; the dielectric form comprising a glass envelope enclosing the conductive piston, said electrode and at least a portion of the operating mechanism, said envelope being constituted of a material selected from the group consisting of borosilicate, potash-lead and potash-soda-lead glasses containing from .01% to 5% by weight of an impurity selected from the group consisting of oxides of chromium, cobalt, manganese, iron, cadmium, gold, selenium, and mixtures of said oxides.

2. The adjustable capacitor as defined in claim 1, in which the impurity is chromic oxide and is incorporated in said envelope in an amount of from 0.2% to 1.5% by weight of the glass material of said envelope.

3. The adjustable capacitor as defined in claim 1, in which the impurity is cobalt oxide and is incorporated in said envelope in an amount of from 0.02% to 0.6% by weight of the glass material of said envelope.

4. The adjustable capacitor as defined in claim 1, in which the impurity is manganese dioxide and is incorporated in said envelope in an amount of from 1 to 5% by weight of the glass material of said envelope.

5. The adjustable capacitor as defined in claim 1, in which the impurity is ferric oxide and is incorporated in said envelope in an amount of from 0.5 to 5% by weight of the glass material of said envelope.

6. The adjustable capacitor as defined in claim 1, in which the impurity is a mixture of chromic oxide and cobalt oxide in the amounts of from 0.5 to 1% and 0.02 to 0.4%, by weight of the glass material of said envelope.

7. A trimmer capacitor comprising a bushing, a longitudinal movable piston having a silver plated peripheral surface defining a first electrode, said surface being covered by a protective amorphous chromate conversion coating, a dielectric form surrounding said piston and having a second electrode connected thereto for cooperation with said first electrode, and an operating mechanism for moving the piston lengthwise of the second electrode for varying the capacitance between said first and second electrodes; said dielectric form comprising a glass envelope enclosing the piston, the second electrode and at least a portion of the operating mechanism, said envelope being constituted of a material selected from the group consisting of borosilicate, potash-lead and potash-soda-lead glasses containing from 0.2 to 1.5% by weight of the glass composition, of chromic oxide.

References Cited by the Examiner

UNITED STATES PATENTS

| | | | |
|---|---|---|---|
| 1,737,685 | 12/29 | Rising | 106—54 |
| 1,924,752 | 8/33 | Rising | 106—54 |
| 1,961,603 | 6/34 | Jena | 106—54 |
| 2,077,481 | 4/37 | Huppert | 106—54 |
| 2,607,826 | 8/52 | Barnes | 317—249 |
| 2,714,558 | 6/55 | Mook | 106—54 |
| 2,924,636 | 2/60 | Broderick | 106—54 |
| 3,114,863 | 12/63 | Dalton | 106—54 X |

JOHN F. BURNS, *Primary Examiner.*

DARRELL L. CLAY, *Examiner.*